Dec. 7, 1926.
E. McPHAIL
1,609,482
LUGGAGE CARRIER
Filed May 19, 1925
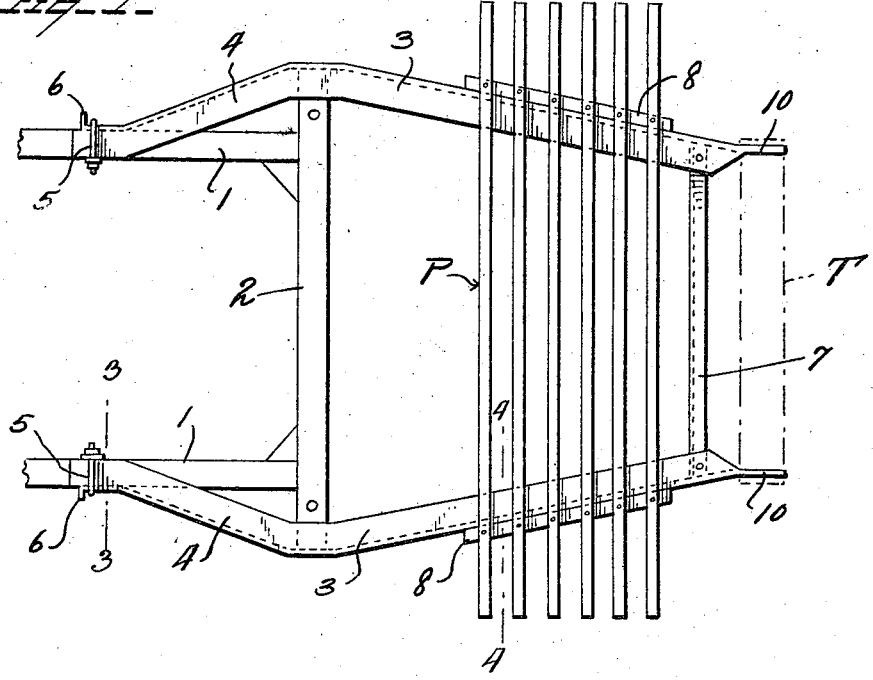
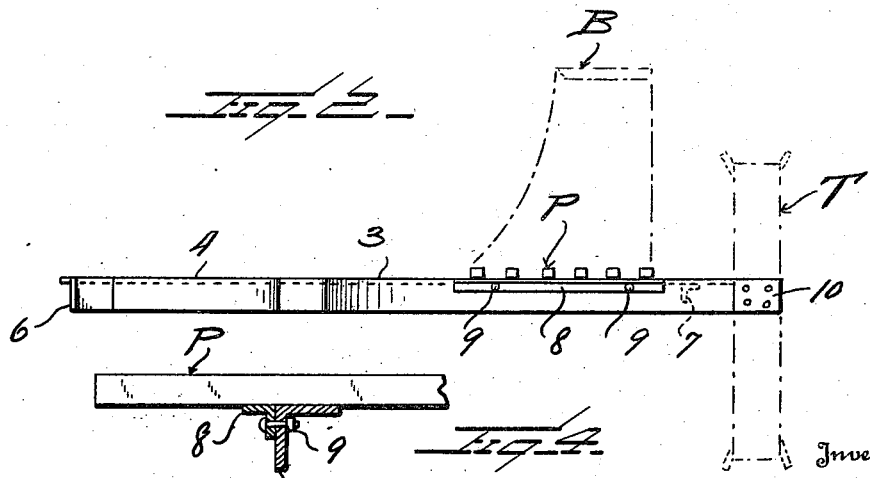
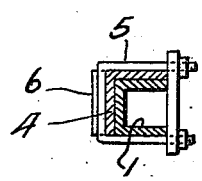
Inventor
E. McPhail
By Watson E. Coleman
Attorney Patented Dec. 7, 1926.

1,609,482

UNITED STATES PATENT OFFICE.

EWEN McPHAIL, OF MISSOULA, MONTANA, ASSIGNOR OF ONE-HALF TO JAMES KIRK THOMSON, OF MISSOULA, MONTANA.

LUGGAGE CARRIER.

Application filed May 19, 1925. Serial No. 31,360.

This invention relates to certain improvements in luggage carriers and it is an object of the invention to provide a device of this kind comprising side bars adapted for connection with the side members of a vehicle frame or chassis together with means at the outer portion of said side bars to support an extra tire.

The invention consists in the details of construction and in the combination and arrangement of the several parts of my improved luggage carrier whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan illustrating a luggage carrier constructed in accordance with an embodiment of my invention in applied position, an applied tire carrier being indicated by broken lines and the coacting portion of a vehicle frame or chassis being shown in fragment;

Figure 2 is a view in side elevation of my improved carrier as herein disclosed, a tire carrier and a box or trunk being indicated by broken lines;

Figure 3 is a sectional view taken substantially on the line 3—3 of Figure 1;

Figure 4 is a sectional view taken substantially on the line 4—4 of Figure 1.

As disclosed in the accompanying drawing, 1 denotes the rear end portions of the side members or sills of an automobile frame or chassis and 2 the rear cross end sill thereof which extends outwardly beyond the side members or sills 1. My improved carrier comprises the side members 3 converging toward their outer ends, each of said side members 3 constituting an angle iron and having the rear portion of its upper flange resting upon the extremities of the cross member or sill 2. The inner end portions of the side members 3 are continued by the inwardly converging extensions 4 also of angle formation and which have the free end portions of their upper flanges resting upon the side members or sills 1 and held thereto by the U-clamp bolts 5. The extension arms 4 outwardly of the applied clamps 5 have their vertical flanges provided with the outstanding lips 6 whereby the clamps 5 are effectively held against displacement with respect to the applied carrier.

The outer or forward end portions of the side members 3 are connected by the angle iron 7.

A slotted platform P is rested upon the side members 3 and comprises the angle irons 8 extending transversely of the platform and having close contact with the vertical flanges of the members 3 and secured thereto by the bolts 9. The side members 3 are of a length to extend a desired distance beyond the rear of the body of the vehicle and the platform P is adapted to have mounted thereon a box B or the like as indicated by broken lines in Figure 2, the inner face of said box being preferably of a curvature to substantially conform to the adjacent rear wall of the body. The free or outer ends of the side members 3 have their vertical flanges extended to provide the arms 10 substantially in parallelism to which is adapted to be attached a tire carrier T indicated by broken lines in Figures 1 and 2 of the drawing.

A carrier constructed in accordance with my invention can be readily applied or removed and can be employed with pronounced advantage for the purposes desired and is especially advantageous in view of the fact that access may be had to the platform P without requiring the removal of the tire carrier T.

From the foregoing description it is thought to be obvious that a luggage carrier constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with the side members and end cross member of a vehicle frame, a carrier comprising side members having flanges resting upon the extremities of the end member, said second side members having end portions extending toward the side members of the frame with flanges resting on said side members of the frame, clamping means for said end portions of the side members of the carrier and the side members of the frame and surrounding the same, a platform mounted upon the opposite end portions of the side members of the carrier, and outstanding flanges at the inner end portions of the side members of the carrier to hold the clamping means against displacement.

2. In combination with the side members and end cross member of a vehicle frame, a carrier comprising angle side members, each of said side members having a horizontal flange inwardly disposed and with a vertical flange downwardly directed, said upper flange resting upon an end portion of the cross member, the rear end portion of said flange resting upon a side member of the frame at a point inwardly of the cross member, means for clamping said side member of the carrier to the side member of the frame, a platform mounted upon the side members of the carrier and outwardly of the cross member of the frame, the vertical flanges of the side members of the carrier being extended to provide means to support vertically a tire carrier, the inner extremities of the vertical flanges of the side members of the carrier being provided with outstanding flanges to hold the clamping means against displacement.

In testimony whereof I hereunto affix my signature.

EWEN McPHAIL.